United States Patent [19]

Hirose

[11] 4,362,455

[45] Dec. 7, 1982

[54] VIBRATING BOWL FEEDER

[76] Inventor: Yoshiyuki Hirose, 7-24-B-4 Hirose 2-Chome, Shimamoto-Cho, Mishima-Gun, Osaka, Japan

[21] Appl. No.: 52,244

[22] Filed: Jun. 26, 1979

[30] Foreign Application Priority Data

| Jun. 26, 1978 | [JP] | Japan | 53-077683 |
| Apr. 19, 1979 | [JP] | Japan | 54-048585 |
| May 5, 1979 | [JP] | Japan | 54-055047 |
| May 15, 1979 | [JP] | Japan | 54-064725[U] |

[51] Int. Cl.³ .................. B65G 65/00; B65G 27/16
[52] U.S. Cl. .................................. 414/306; 198/757
[58] Field of Search ............... 414/306; 198/756, 757, 198/766

[56] References Cited

U.S. PATENT DOCUMENTS

| 3,032,174 | 5/1962 | Lake et al. | 198/757 |
| 3,599,783 | 8/1971 | Burgess, Jr. | 198/757 |

FOREIGN PATENT DOCUMENTS 666850  12/1974  U.S.S.R. ............................. 198/757

Primary Examiner—James B. Marbert
Attorney, Agent, or Firm—Darby & Darby

[57] ABSTRACT

A bowl having a spiral track on its own inner circumference is fixed fast on a vibrating plate. To this vibrating plate is given the obliquely rotational vibration composed of the horizontal rotation and the up-and-down motion, and the elliptical vibration as well, with the use of a driving mechanism driven by a motor jointly with an up-and-down mechanism. These vibrations may be made now linear now non-linear dependingly on the form of the cam attached to the shaft of the motor.

5 Claims, 28 Drawing Figures

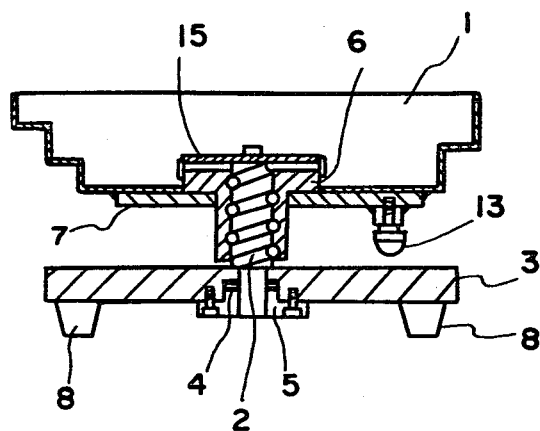
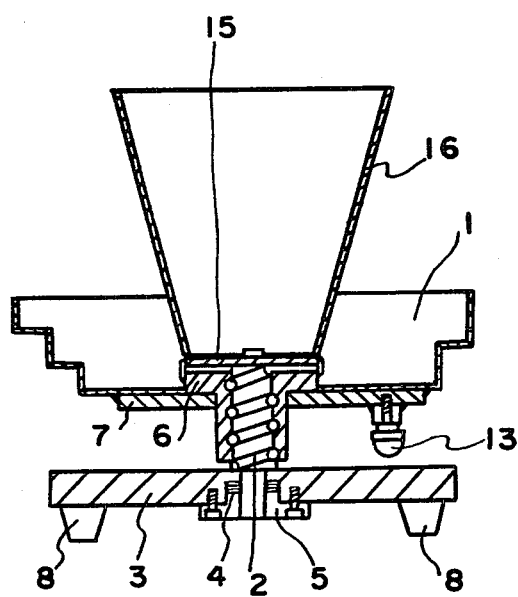

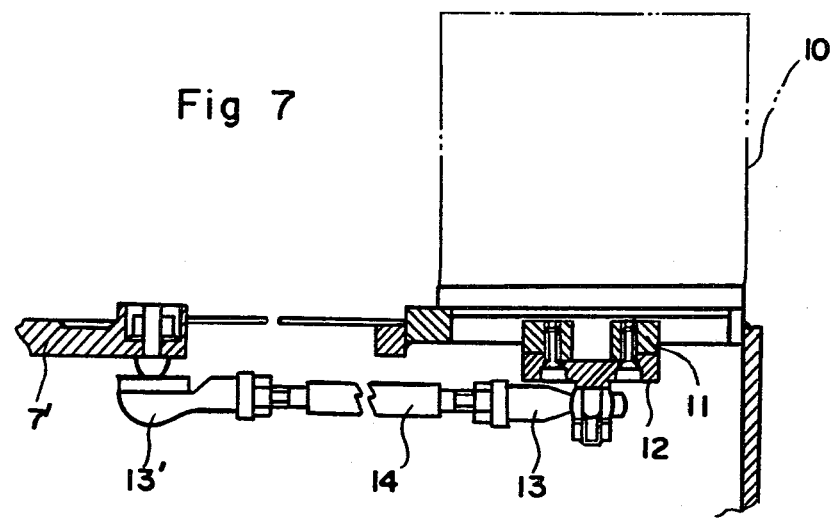
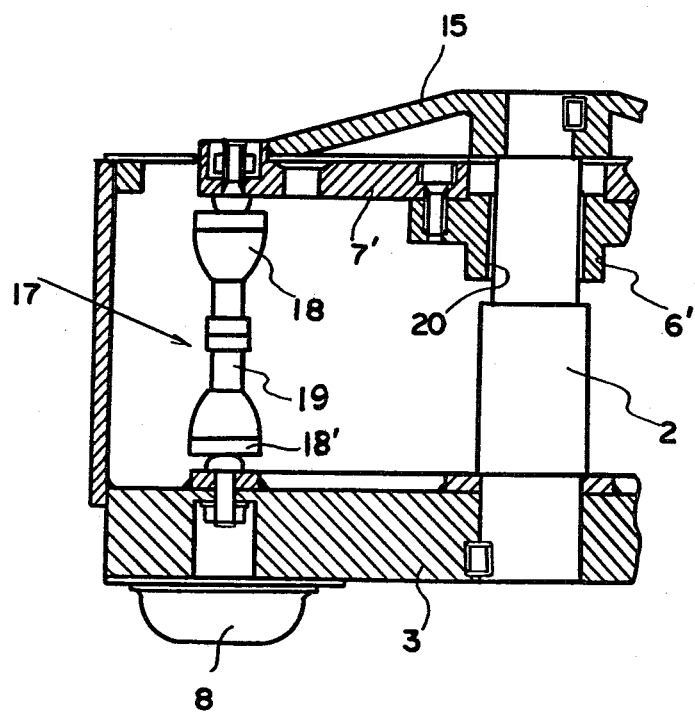

VIBRATING BOWL FEEDER

BACKGROUND OF THE INVENTION

The present invention relates to an improvement of a vibratory bowl feeder which is used in orienting and feeding the machine parts automatically, and more particularly is concerned with a new-type motor-driven vibratory bowl feeder wherein the bowl performs linearly or non-linearly the tilting or elliptical vibration.

For the purpose of automatically orienting the machine parts and the other articles such as, for example, powdery or granular substance, and feeding certain of automatic manufacturing apparatuses such as automatic assembly machines, automatic processing machines, automatic packing machines or the like with these materials by the necessary amount at a time, vibratory bowl feeders, which were driven by an electromagnet (solenoid), were widely used heretofore. These kinds of vibratory bowl feeders are constructed in such manner that a cylindrical or saucer-like vessel, namely a bowl, wherein the machine parts and the other articles are to be stored, may be supported by several sets of plate springs which tilt at a certain angle, that an iron piece, which is stuck to the underside of the bowl, will be made to be vibrated in the vertical direction and simultaneously be put into the angular or horizontal vibration around the vertical shaft, and that the thus resultant vibration in the oblique direction can be transmitted to the bowl. As a result, the machine parts and the other articles standing on call within the bowl are conveyed upwardly along a spiral track provided on the internal circumference while being oriented by some attachments fitted up parallel to the periphery of the above track, thus being carried out of the delivery port at the terminus of the track.

There is utilized here the vibration peculiar to the bowl containing the machine parts with the addition of the other sections being supported by several springs as of iron pieces as a whole. In this case, the number of vibration of the solenoid as a driving source will take a fixed value dependently on the frequency of the power source, so that it is inevitable to decide the strength of the supporting springs in order that both the frequencies may be brought into accordance with each other in consideration of preventing the unbalance between the form and weight of the bowl and the weight of the attachments or the machine parts. What is more, the adjustment of the gap (air-gap) between the armature and the solenoid, and of the setting angle of the supporting springs governing the delivery velocity, and so on requires the one-piece job-like adroitness of very high grade. Accordingly, the adoption of such a construction could not help being too much expensive conjointly with the use of the solenoid and related parts.

In the apparatus of such a construction, on the other hand, the delivery velocity of the machine parts comes to be dependent on the amplitude because of the definite and unchanging vibration of it. In case of the amplitude being too large, the articles which drift away from the delivery path can not keep in touch with the latter after once having run against it, as a result of which the movement becomes unstable, the efficiency drops, and the delivery velocity is restricted under a certain limit. In addition, as the amount of the articles put in the bowl changes, the number of vibration of its own nature fluctuates, giving rise to the unreasonableness attributable to the gap between itself and the frequency of the solenoid. Such was the fault of the apparatus of this kind which would also call forth the lowering in performance.

With the object of avoiding such an inconvenience, there is being proposed a variety of improvements what by coating the internal face of the bowl with urethane resin and the like in order to heighten the coefficient of friction, and what by employing high-power plate springs and solenoid in order to bring about the stability of vibration. However, so long as the bowl is supported with the use of plate springs and is driven through the aid of solenoids, it is impossible to completely eliminate the above-mentioned drawbacks.

As for the aforesaid angular vibration, this results from the vertical vibration. There is no phase difference between them. Accordingly, the oblique vibration composed of these two produces a straight-line simple harmonic motion in the direction perpendicular to the plate springs. For this reason, the backward slip is liable to happen between the conveyed articles and the surface of the track by any means, so that, even though increasing the number of vibration or the amplitude, it has been hard to obtain so much effect as yet. In order to eliminate these defects, there have been developed such methods or devices as to be able to create the vibration describing an elliptical locus by employing two sets of the supporting plate springs and the solenoids, one set used for the angular vibration and the other used for the vertical vibration, and thereby by making both solenoids each generate the vibration having the phase difference, respectively (for example, Japanese Official Pat. No. 7289-1969, and No. 32368-1969). However, these kinds of things have scarecely been used in general so far because of their complicated structure, difficulty in adjustment, and expensiveness.

The aforesaid angular vibration is the sine wave vibration, namely, the linear vibration, whose motion is one and the same both in the conveying direction and in the reverse direction. Accordingly, here tends to happen the backward rise or jump between the articles and the surface of the track at any rate, so that it was impossible so far to prevent the lowering of the efficiency of conveyance or to avoid the occurrence of noise. In other words, at the backward lower end of the oblique vibration, the acceleration in the forward direction amounts to the maximum. If this is greater than the frictional force between the articles and the surface of the track, the articles are subject to the backward rise. On the other hand, at the forward upper end of the oblique vibration, the acceleration in the vertical direction reaches the maximum. If this is greater than the acceleration of gravity (g), the articles drift away from the surface of the track to jump. In order to get rid of such a state of things, ideally speaking, it will be commendable to cause the non-linear vibration to be created by discriminating between the time of forward motion (conveyance of the articles) and the time of backward motion to make them have the difference in the number of vibration, respectively. However, it may be difficult, or rather impossible, to expect such a good thing from conventional devices which are only so designed as to be supported by solenoid-driven plate springs. Hence, in conventional vibratory bowl feeders, various kind of contrivance were thought of for the purpose now of coating the inside of the bowl with rubber, urethane resin and the others to increase the frictional force between the articles and the surface of the track, on one side, and to minimize the noise produced by the collision of the articles with the surface of the track, on the other hand, and now of holding back the occurrence of noise by reducing the amplitude. Nevertheless, it was impossible to silence the noise caused by the article-against-article collision. It would be a mere waste of words, but there was not a choice for feeders of such construction as described above but to be enveloped as a whole in a soundproof equipment. Such being the case, general-purpose vibratory bowl feeders heretofore in use were subject to various sorts of limitations and controversial points about their function and construction on account of employing solenoids in the capacity of the driving source.

SUMMARY OF THE INVENTION

The present invention has for its object to provide a new-type vibratory bowl feeder which eliminates all sorts of faults and controversial points of conventional vibratory bowl feeders that induce the bowl to exert the simple harmony motion (composition of the rotational and vertical vibrations) in the oblique direction while supporting the bowl by the combined action of a solenoid and the plate springs; which is of simplicity of construction and easy to be adjusted at the time of assembling, and is of light-weight and compact design of less power consumption; whose performance is not affected by the geometry of the bowl, the number and fitting positions of the attachments, and the quantity of the articles put in the bowl, so that its frequency of vibration and its amplitude are able to be easily adjusted at will; each section of which is free from the magnetization through the solenoid; and which has the excellent characteristics to be capable of delivering the articles uniformly and stably.

Another object of the present invention is to secure easily the elliptical vibration in one and the same vertical plane as the ideal form of the vibration through the simple procedure whereby the articles are conveyed with high efficiency and exactitude.

A further object of the present invention is to cause the bowl to perform the non-linear vibration, thereby allowing the bowl to do the ideal vibration which not accompanied by any backward slip or jump of the articles resulting from the coefficient of friction between the articles and the surface of the track, as a result of which the conveyance of the articles is conducted exactly under the low-noise conditions.

Other and further object of the present invention will become obvious upon an reading of the preferred embodiment about to be described or will be indicated in the appended claims, and various advantages not referred to herein will occur to those versed in the art upon employment of the invention in practice.

BRIEF DESCRIPTION OF THE DRAWINGS

FIG. 3 is a vertical sectional end view taken along the lines I—I of FIG. 1;

FIG. 4 is a vertical sectional end view of a modified embodiment taken substantially at the same position as in the case of FIG. 3;

FIG. 7 is a vertical sectional end view taken substantially along the lines II—II of FIG. 5;

FIG. 8 is a vertical sectional end view taken substantially along the lines III—III of FIG. 5, similarly to the case of FIG. 7;

FIGS. 10 to 14 show another example according to the present invention, out of which:

FIG. 10 is a plan view thereof;

FIG. 11 is a front view thereof;

FIG. 12 is a vertical sectional view taken along the lines IV—IV of FIG. 10;

FIG. 13 is a partially enlarged sectional view taken along the lines V—V of FIG. 11; and FIG. 14 is a left side view seen in the direction of the arrowheads of the lines VI—VI of FIG. 11;

FIGS. 16 to 18 show an example of a vibratory bowl feeder, wherein the baseplate of the bowl is separately driven, out of which:

FIG. 16 is a front view thereof;

FIG. 17 is a sectional view, showing another example of the same; and

FIG. 18 is a partially sectional front view, showing yet another example;

FIGS. 19 to 28 show a device according to the present invention which performs the elliptical vibration, out of which:

FIG. 19 is a plan view thereof;

FIG. 20 is a front view thereof;

FIG. 22 is a vertical sectional view taken on the line VII—VII of FIG. 19;

FIG. 21 is a vertical sectional view taken on the line VIII—VIII of FIG. 20;

FIG. 23 is a cross-sectional view of FIG. 20 taken along the lines IX—IX of FIG. 22;

FIG. 24 is an explanatory drawing showing the correlation between the two vibrating plates and the one link;

FIG. 25 is an explanatory diagram showing the state of vibration of the two vibrating plates;

FIGS. 26 to 28 are rough plan views of different driving devices in the other examples, respectively.

DETAILED DESCRIPTION OF A PREFERRED EMBODIMENT

The device according to the present invention will now be described in detail with reference to several examples which are illustrated in the appended drawings.

Figure 1:
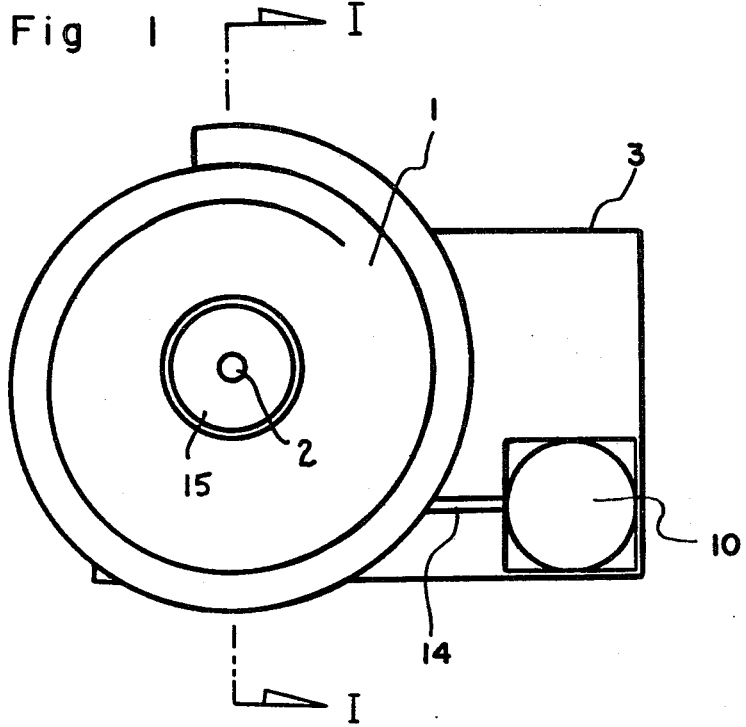
FIG. 1 is a plan view of a vibratory bowl feeder according to the present invention.
Figure 2:
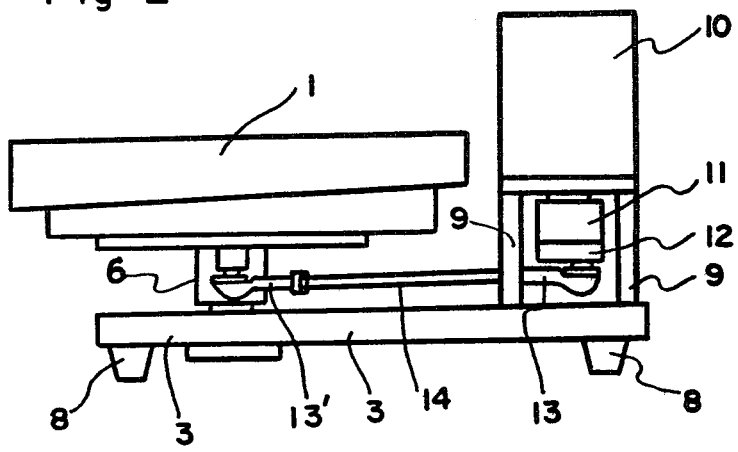
FIG. 2 is a front view thereof.
Figure 5:
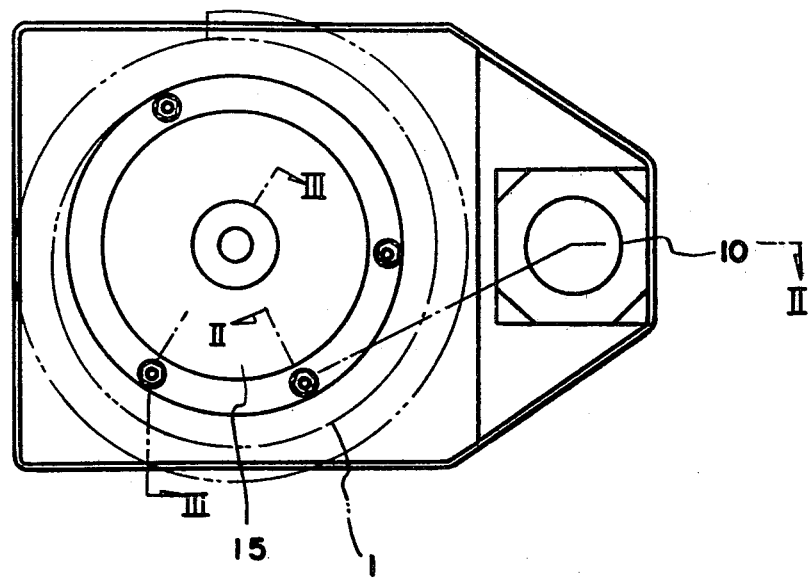
FIG. 5 is a plan view of another embodiment.

FIGS. 1 to 3 show an example of a vibratory bowl feeder according to the present invention, wherein a main shaft (2) rotatably supporting a bowl (1) is fixedly erected to the side of one end of the widthwise centrau part of a base (3) by means of a clamp sleeve (4) and a keep plate (5).

About upper two thirds part of the main shaft (2) is threaded with a spiral groove, which constitutes a ball screw. The screw part of the main shaft (2) is fastened with a lead nut (6). The bowl (1) is mounted fixedly on the adapter plate (7) tightly secured by the lead nut (6) in such a manner that the central axis of the bowl may be brought in line with the center of the main shaft (2).

In this occasion, it is allowable to install the bowl (1) directly on the lead nut (6) by forming the bowl (1) and the adapter plate (7) in one piece. The reference numeral 8 in the figure indicates a vibration-proof rubber which is to support the base (3). On the upper ends of stays (9) . . . , which are erected on the other end part of the base (3), an electric motor (10) is stationed. The driving means is made up in such a manner that an eccentric plate (12) is connected to the shaft of the motor (10) with the interposition of a boss (11), on one side, and is, on the other, connected to a tie rod (14) and a rod end (13') with the medium of a rod end (13), and then the rod end (13') is connected to the underside of the adapter plate (7).

In such an arrangement, the adapter plate (7) and the bowl (1) perform together the horizontally rotational vibration with the central axis of the bowl as the center of rotation through the crank motion of the rod ends (13) (13') and the tie rod (14) resulting from the rotation of the motor (10) and therethrough the eccentric plate (12), and simultaneously make the vibration in the vertical direction along the spiral groove of the main shaft (2), in consequence of which they come to do the simple harmonic motion in the oblique direction.

The behavior of the bowl (1) in this case is the same as in the case of conventional vibratory bowl feeders. Be that as it may, the number of vibration of conventional vibratory bowl feeders is regulated by the frequency of the solenoid (3600 or 7200 cycles per minute at 60 Hz), whereas the vibratory bowl feeder according to the present invention is capable of obtaining any number of vibration only by altering the number of revolution of the motor used. Therefore, if using some air motor of several tens of thousands rpm), for example, it becomes possible to increase the delivery velocity of the articles without enlarging the amplitude, or to bring about the reliable motion by reducing the number of vibration to 10-30 cycles per minute. Further, this device, wherein the bowl is coerced into vibrating by the crank motion of the motor (10), is able to select the amplitude or the number of vibration in the optimum conditions correspondingly to the sorts of the articles or the process of assembling without any fluctuation in performance due to the geometry of the bowl or the quantity of the articles put therein. Such a feature is advantageous at the time of t reating large-sized articles in particular. The adjustment of the amplitude is able to be operated dependently upon the degree of eccentricity of the eccentric plate and the setting position of the rod end (13') on the adapter plate (7). The interval between the rod ends (13) and (13') can be extended or shortened by turning the tie rod (14).

In the foregoing example, the upper about two thirds part of the main shaft is formed with the ball screw, but it may be replaced by a mere lead screw having no use for the balls. In passing, the direction of vibration of the bowl (1) in this example comes to be decided dependently on the angle of the spiral groove of the main shaft (2).

On the other hand, the load of the articles applied to the shaft cover (15), which is fixed on the top end part of the main shaft (2), is directly applied to the base (3) through the main shaft (2) regardless of the bowl (1) and the adapter plate (7), in consequence of which the load applied to the motor (10) is lightened so much, even if the large quantity of the articles is put in the bowl at a time. If a hopper (16) is fixedly built on the shaft cover (15) in the interior of the bowl (1), as shown in FIG. 4, the load applied on the motor (11) is less under the beforehand storage of a great amount of the articles within the hopper (16), thereby the articles always coming to be fed into the bowl (1) by a little quantity and the optimum conditions.

Figure 6:
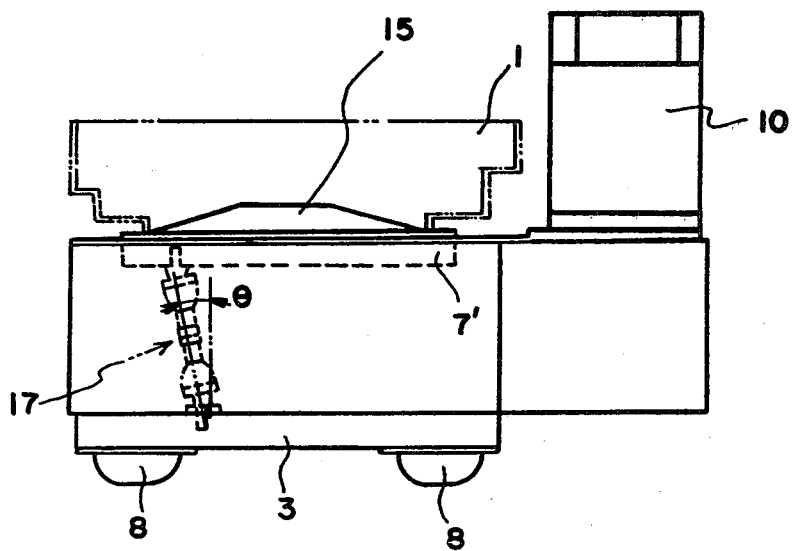
FIG. 6 is a front view thereof.

FIGS. 5 to 8 show another example wherein a link (17) is adopted in the capacity of a mechanism for the up-and-down vibration of the adapter plate (7) and therethrough the bowl (1). In this case, the bowl (1) is mounted on the upper face of the adapter plate (7) which is fastened by a holder (6') slidably and rotatably fitted onto the main shaft (2). In this arrangement, the bowl (1) is made to be vibrated while rotating in the horizontal plane by the driving device, and concurrently is brought into the up-and-down vibration by the action of the link which is installed between the adapter plate (7') and the base (3) at a certain angle $\alpha$, as shown in FIG. 6.

The driving device here is the same as in the preceding example. That is, as shown in FIG. 7, the eccentric plate (12) is attached through the boss (11) to the motor shaft, and then the eccentric plate (11) is connected through the rod ends (13) and (13') and the tie rod (14) to the underside of the adapter plate (7').

As shown in FIGS. 6 and 7, the link (17) is constructed by coupling the rod end (18) with the rod end (18') in such a manner as to be able to adjust the interval between these two rod ends by the use of a tie rod (19). This link (17) is provided between the adapter plate (7') and the base (3) in the state such as inclined to the tangential direction of the adapter plate (7') by the angle $\theta$.

In such an arrangement, this angle $\theta$ can be adjusted so as to keep the device in the optimum conditions dependingly upon the angle of the track of the bowl (1) or the variation of the coefficient of friction. Incidentally, in this example, dry bearing (20) is used with the object of making the holder (6') rotatable and slidable, but it does not matter of course if the other kinds of bearings, rotatable and movable up-and-down, are employed.

Figure 9:
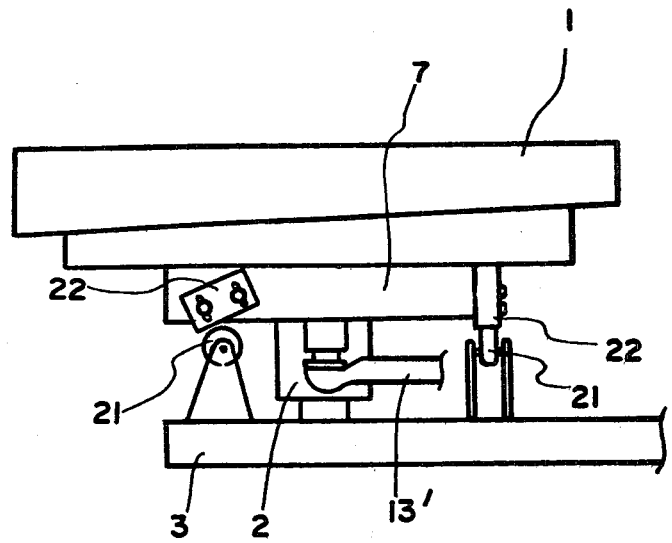
FIG. 9 is a front view in the rough, showing still a further embodiment.
Figure 10:
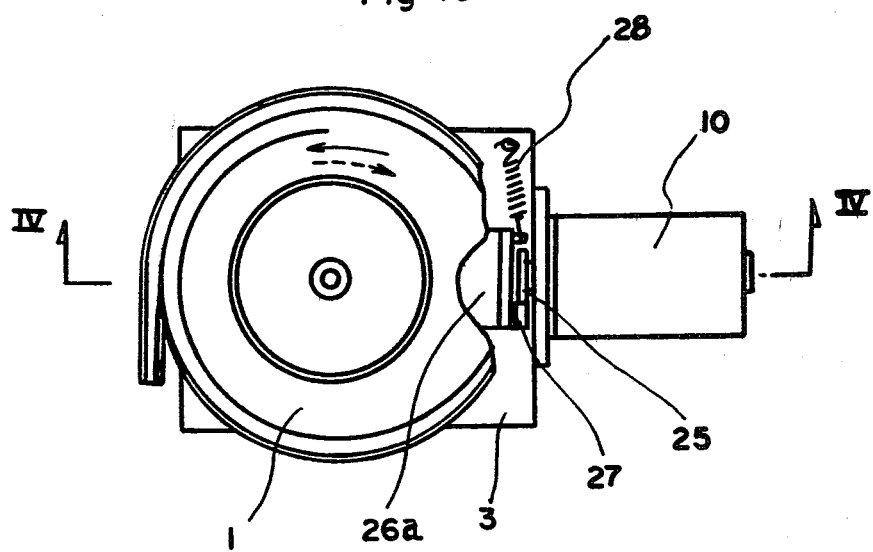
Figure 11:
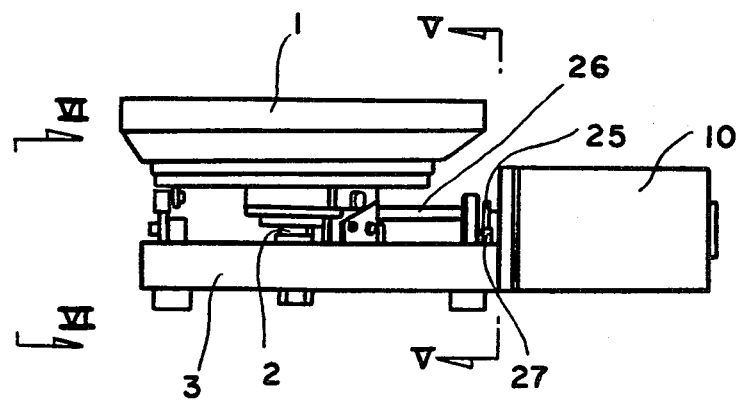

Further, it may be allowable also to use something as of cam in the capacity of the mechanism for the vertical movement. By way of example, as shown in FIG. 9, inclined cams (22) . . . impinging upon rollers (21) . . . fixed on the base (3) are attached to the under face or the flank of the adapter plate (7'). With the revolution of the adapter plate (7'), this adapter plate (7') itself makes the up-and-down movement while rotating through the aid of the motion of the inclined cams (22) . . . on the rollers (21) . . . . The angle of inclination of the inclined cam may be made variable.

FIGS. 10 to 14 show a vibratory bowl feed which is different from any of the above-described examples in the point of the driving device. The essentials of this example reside in that the vibrating plate (24) is rotatably and movably up-and-down through the bearing on the main shaft (2) which is fixedly erected in the somewhat central part of the base (3), that the bowl (1) is fixed fast on the upper surface of the vibrating plate (24) in such manner that the central axis of the bowl (1) may be coincide with the center of the main shaft (2), and that the vibrating plate (24) and therethrough the bowl (1) are brought into the obliquely rotational vibration through the aid of the driving device (A) powered by the motor (10) and the up-and-down vibration mechanism (B).

Figure 12:
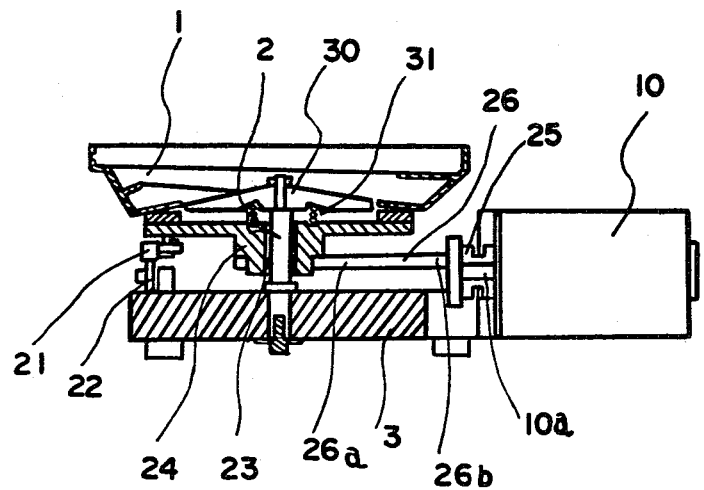
Figure 13:
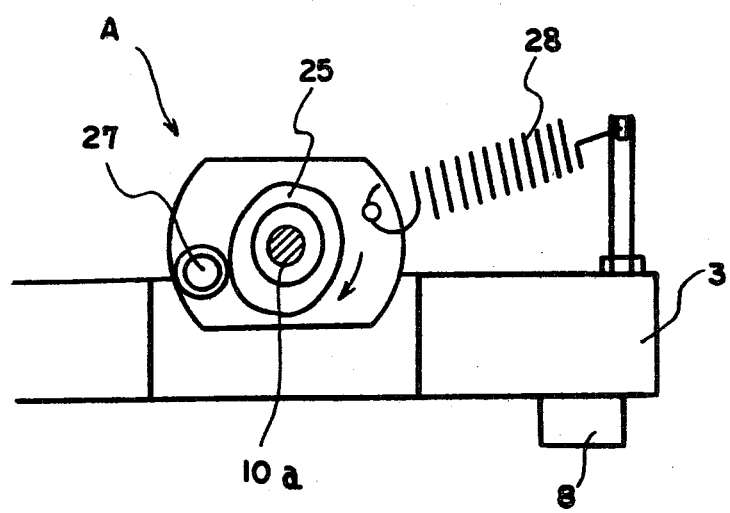

The driving device (A) is composed, as shown in FIGS. 12 and 13, of the motor (10) being mounted fixedly on the base (3), the driving cam (25) being fastened to the motor shaft (10a), the oscillating arm (26) stationing the basal (26a) part on the vibrating plate (24) and attaching to the top part (26b) the driving cam follower (27) which impinges upon the driving cam (25), and a spring (28) which compresses the driving cam follower (27) against the driving cam (25) to energize the latter. In this case, this spring (28) is not wanted if the driving cam (25) is replaced by a grooved cam.

Figure 14:
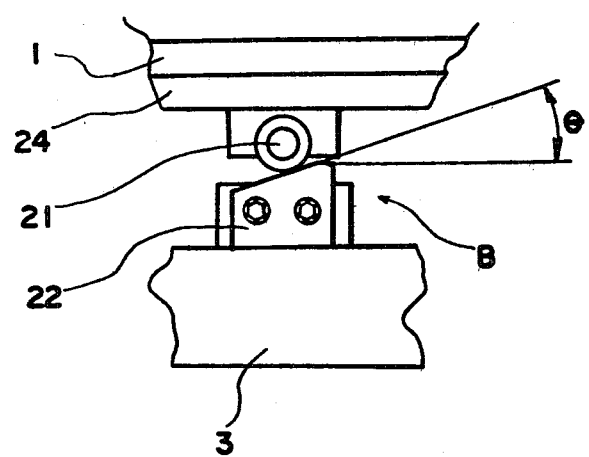

The up-and-down vibration mechanism (B) consists of, as shown in FIG. 14, three pieces of inclined cams (22) . . . being stationed on the base (3), and rollers (21) impinging upon the respective inclined cams (22) . . . and being attached to the under face of the vibrating plate (24) with a view to supporting the latter.

The working principle of this example is as follows:

For a start, the motor (10) actuates the driving cam (25) to rotate in the direction of the arrow in FIG. 13. Then this rotational motion is transmitted through the driving cam follower (27) and the oscillating arm (26) to the vibrating plate (24), which does thereby the rotational vibration in the horizontal direction and makes at the same time the up-and-down motion by the action of the inclined cams (22) . . . and rollers (21) . . . . Eventualy, these two motions are composed into the obliquely rotational movement.

In this connection, if the driving cam (25) is made in the form of a disc and is attached to the motor shaft (10a) eccentrically, the vibrating plate (24) comes to conduct the inclined simple harmonic vibration (linear vibration). Otherwise, it will do well to use such a driving cam (25) as being made in the form having the variety in radius with the purpose of causing the obliquely rotational vibration of the vibrating plate (24) and therethrough the bowl (1) to be able to perform the nonlinear vibration which has the difference in the acceleration in the conveying or returning direction of the articles, as shown in FIG. 13. However, the decision of the form of the driving cam (25) must be done in such a manner that, at the time of rotating in the conveying direction of the articles (the continuous line arrow in FIG. 10), the vibrating plate (24) can rotate at the less acceleration so as not to give rise to the backward rise of the article, and on the contrary at the time of rotating in the reverse direction, it may rotate at as large as possible in the range of its vertical component being less than the acceleration of the gravity (g). Both of these accelerations may be good to be the respective rated accelerations and also can vary in their respective scopes.

In the above example, there are used three pairs of both inclined cams (22) and rollers (21). But it does not matter whether the number of them is one to three or more in consideration of the weight of the bowl and the other condition. Further, the different modifications may be given to the obliquely rotational movement now by making the angle of inclination ($\theta$ in FIG. 14) of the inclined cam (22) variable and now by forming the cam face to be not straight-lined, but parabolic or the other curved. What is more, it is possible to try to do such modifications to adjust the amplitude of the oscillating arm (26) with the help of making the distance of the driving cam (25) from the main shaft (2) variable. Moreover, it is permissible to connect the driving cam follower (27) directly to the vibrating plate (24) or the bowl (1).

To change the subject, the bowl (1) is such that lacks the bottom part, as shown in FIG. 12. At the position of this broken-away bottom part, the base plate (30) is fixed on the top part of the main shaft (2), forming a fixed bottom or separate bottom. The reference numeral (31) in the figure indicates a keep plate energizing the vibrating plate (24) downward. However, it is possible to rotatably support this base plate (30) without fixing it on the main shaft (2), and thereby to vibrate it rotationally together with the vibrating plate (24), or else to allow it to be supported independently. It may be also thinkable to use a bottomed bowl in place of the base plate (30), otherwise to form the bowl (1) and the vibrating plate (24) in one body.

Figure 15:
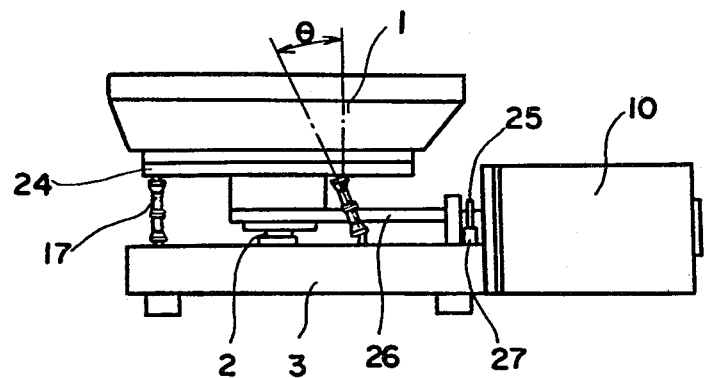
FIG. 15 is a front view of still another example of the abovementioned device.

FIG. 15 shows another example where a link (17) is employed in the capacity of the up-and-down vibration mechanism (B). In this occasion, the link (17) is connected at its upper and lower ends to the vibrating plate (24) and the base (3), respectively, at a certain angle to the vertical direction, for example, in the state inclining nearly as much as the inclination of the surface of the track. The other points are made similarly to the foregoing example. And yet, the width of the upper and lower limits of the amplitude of the vibrating plate (24) can be adjusted by making the inclination of the links (17) . . . variable. As the up-and-down vibration mechanism, it is practicable to use such a think where the upper part of the main shaft (2) is formed into a ball screw, and then a ball nut engaging with the above screw is made to fit in the central part of the vibrating plate (24).

Figure 16:
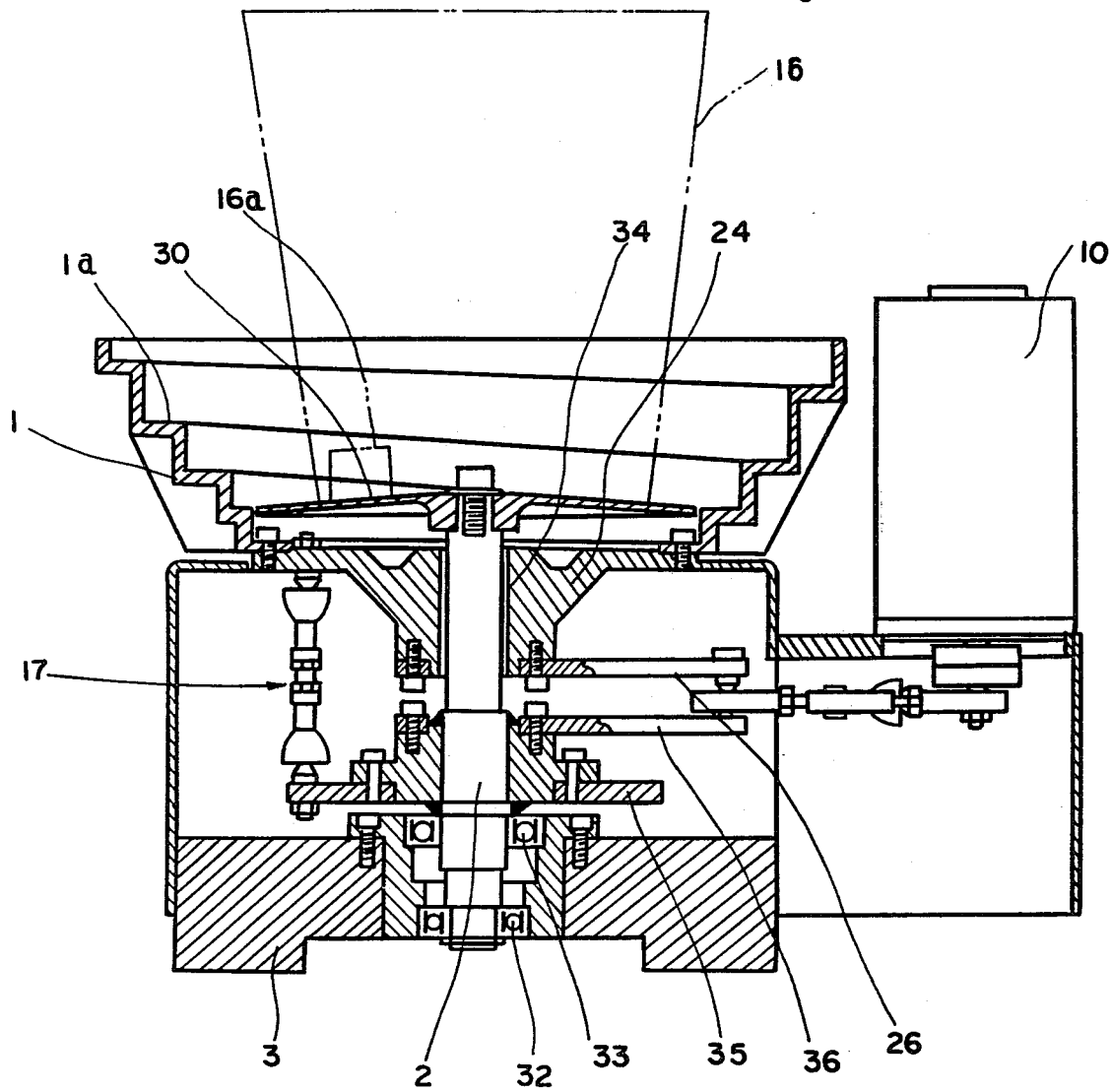

FIG. 16 shows the case where the base plate (30) of FIG. 12 is made to rotate by the motor (10). That is, this brings about the vibration of the angle of rotation horizontally or obliquely for the purpose of stabilizing the movement toward the external periphery of the articles lying on the separated bottom of the vibrating bowl feeder which has the separated base plate (30). The object of this construction intends to make the movement of the article perform positively without being subject to the influence of the coefficient of friction.

As seen in the figure, the device referrer-to here is so constructed that the main shaft (2) is supported on the central part of the base (3) rotatably, that is, so as to make the horizontal rotation with freedom, by means of ball bearings (32), (33); that the base plate (30), which is to constitute the bottom part of the bowl (1), is fixedly secured on the top face of the main shaft (2); and that the bowl (1) is immovably attached to the vibrating plate (24) which is guided to and supported on the main shaft (2) rotatably and movably up-and-down with the medium of the shaft bearing (34). This vibrating plate (24) performs the rotationally angular vibration in the horizontal direction through the oscillating arm (26) by means of the motor (10), and at the same time, since this vibrating plate (24) is connected to the horizontal vibrating plate (35), which is fixedly attached to the under part of the main shaft (2), through the links (17) as the up-and-down vibration mechanism, it makes the up-and-down movement when the horizontal vibrating plate (35) performs the rotational vibration in the horizontal direction through the oscillating arm (36) by means of the motor (10). In the result, both vibrations are composed into the obliquely rotational vibration.

To say in addition, as for the links (17), several sets of them are provided on the concentric circles while inclining all of them in the same direction with the same angle to the vertical direction, thereby serving to make the vibrating plate (24) perform the up-and-down motion through the relative rotation between the vibrating plate (24) and the horizontal vibrating plate (35).

In this way, the bowl (1) starts to perform the obliquely rotational vibration as the motor (1) rotates, when the articles put in the bowl are oriented and conveyed along the spiral track provided on the internal circumference of the bowl. On the other hand, the base plate (30) constituting the bottom part of the bowl conducts concurrently the horizontal rotational vibration. This vibration itself plus the centrifugal force make the articles stagnating at the central part of the bowl (1) transfer toward the spiral track (1a) in the periphery, thus all together leading to the smooth conveyance of the articles. At this time, if the base plate (3) made umbrella-shaped, as shown in the figure, will bring about so much a larger effect, but the horizontal one is good enough as it is.

Figure 17:
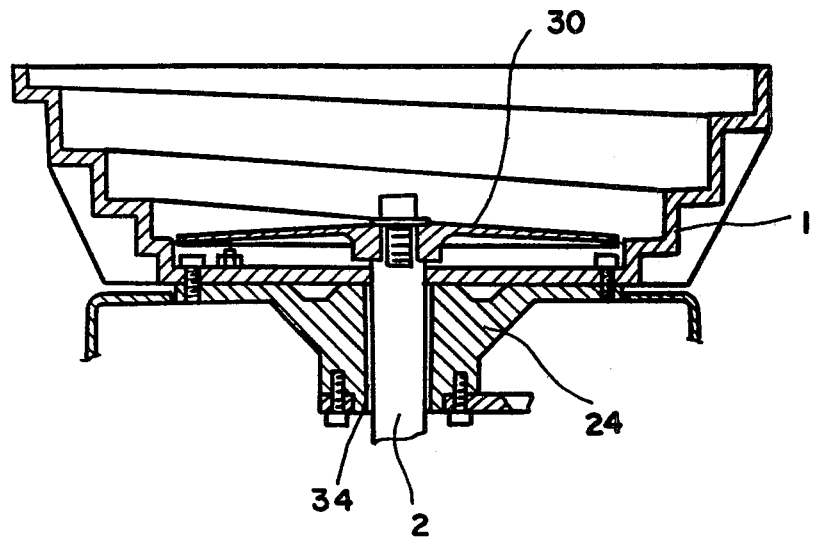

This base plate (30) may be good even if being positioned at the bottom part of such a bottomed bowl (1) as shown in FIG. 17. This kind of bottomed bowl (1) can be made up integrally with the vibrating plate (24). Further, if a hopper (16) built in the bowl is installed on the base plate (30), as shown by the alternate long and two short dash line in FIG. 12, a great deal of the articles can be stored and wait on call, thereby being able to reduce the number of times for putting-in the articles. This hopper (16) built in the bowl is provided with a delivery port (16a) for the articles. The size of this delivery port (16a) may be preferably widened or narrowed dependently on the sort and size of the articles.

The bowl (1) and base plate (30) both can be provided correspondingly to the setting procedure what by making them rotate in the one and the same direction or shift, and what by letting them rotate in the direction opposing to each other as well. If rotating them in the opposing direction, the balance can be kept between the two.

As the supporting way of the vibrating plate (24) and therethrough the bowl (1) from the side of the horizontally vibrating plate (35), there is a method, needless to say, in which the links (17) are employed, as seen in the figure, but in addition to this, it will do to utilize such as cams with rollers, and further it is possible to adopt such a process in which the vibrating plate (24) is separated from the horizontally vibrating plate (35), and then the separated vibrating plate (24) is fitted onto the main shaft (2) which is formed at its upper part into a ball screw with the interposition of a screw nut. Referring now to the method of driving the base plate (30) and the bowl (1) into vibration, it is not limited to the use of cranks and links activated by the motor (10), as seen in FIG. 16. It is allowed also to use cams and rollers, which makes possible the non-linear rotationally angular vibration dependently on the form of the cams. Further, it is feasible to make the vibrating plate (24) and therethrough the bowl (1), and the base plate (30) each separately perform the rotational vibration by connecting the end of the link (17) to another horizontally vibrating plate which is rotatably fitted onto the main shaft, that is, it comes to that the two horizontally vibrating plates are used in this case. Moreover, the rotational vibration of the base plate is not conducted only in the horizontal direction, as described in the preceding example. The like effect is able to be produced also by the inclined base plate.

Figure 18:
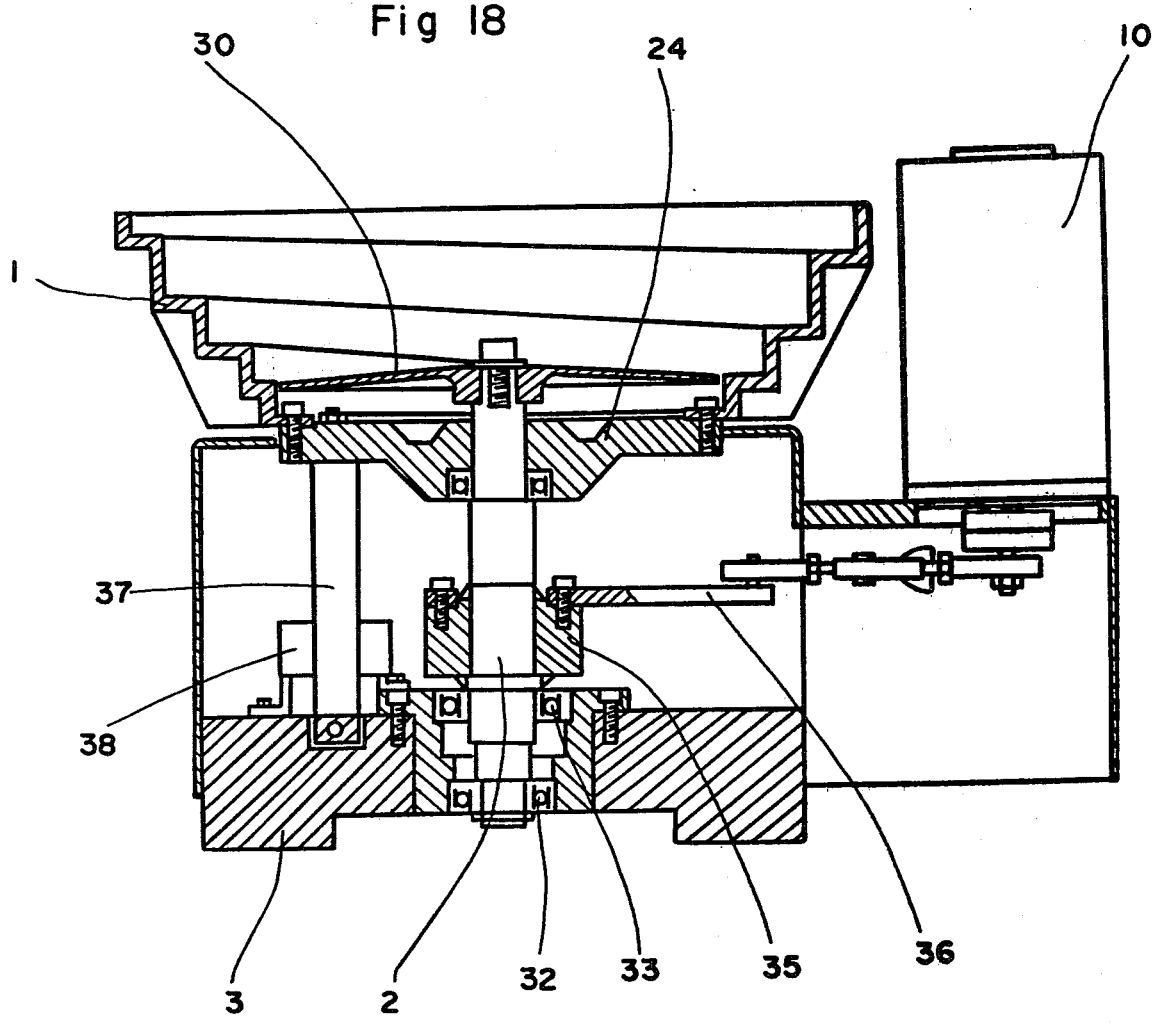
Figure 19:
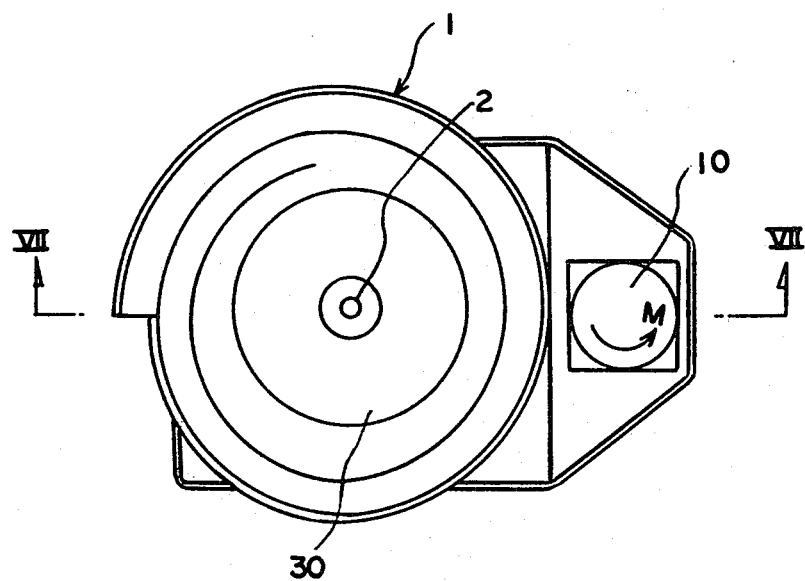
Figure 20:
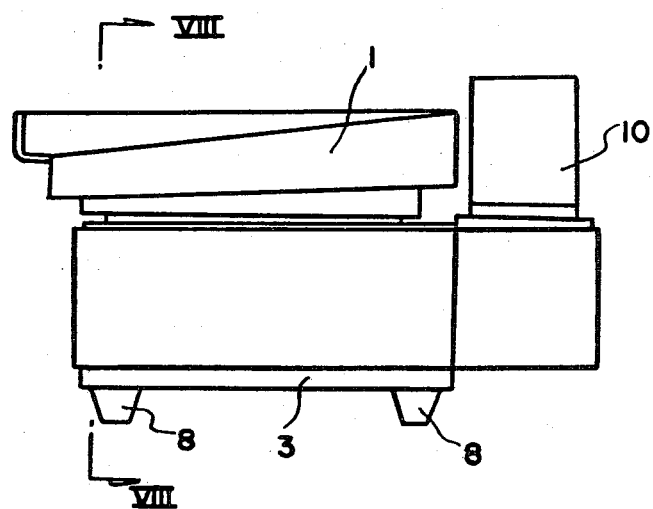
Figure 22:
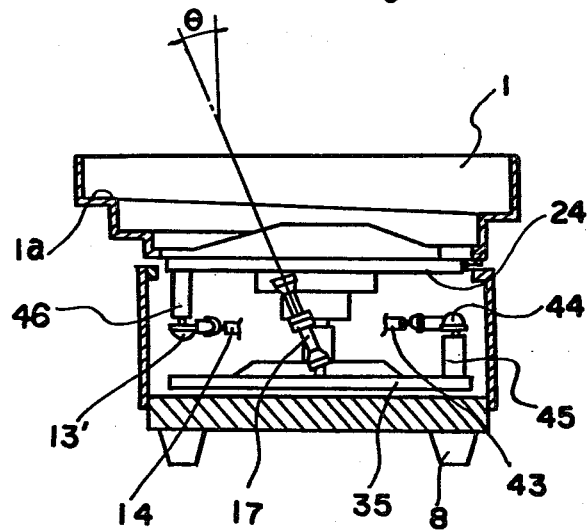
Figure 21:
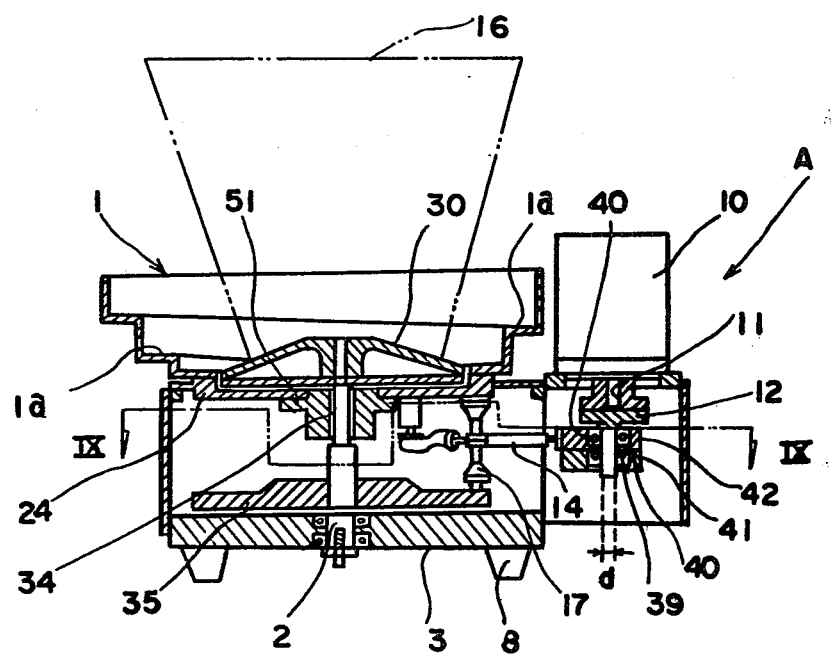

The principle of the rotation of the above-mentioned base plate can be applied to the vibratory bowl feeder which has a separated bottom of the type of being supported by conventional plate springs (37) and being driven by the solenoid (38) as shown in FIG. 18. In this case, in order to drive the base plate (30) of the separated bottom into the rotational vibration, it is necessary either to use the motor (10), as shown in the feature, or to provide one more solenoid separately.

FIGS. 19 to 28 show several examples of different kinds of vibratory bowl feeders which make the bowl (1) perform the elliptical vibration. FIGS. 19 to 23 illustrate an example out of them, where the horizontally vibrating plate (35) is fixed on the lower part of the main shaft (2) which pierces through the central part and is supported thereat rotatably; where the vibrating plate (24) fixedly supporting the bowl (1) is supported on the upper part of the main shaft (2) rotatably and movably up-and-down; and where the horizontally vibrating plate (35) and the vibrating (24) are coupled together by means of the links (17) . . . ; thus giving these two vibrating plates (35), (24) the respective angular vibrations having the phase difference, but being equal in the number of vibration, with the aid of the driving device (A) driven by the motor (10). Incidentally, the bowl (1) may be formed integrally with the above vibrating plate (24) in this case.

The horizontally vibrating plate (35) is stationed on the main shaft (2) in such a manner that the central axis of the former constitutes the center of its own rotation, while on the other hand the vibrating plate (24) is fastened on the holder (51) which pierces through the upper part of the main shaft (2) and is supported thereon through the interposition of the rotatable and slidable bearing (34) in such a manner that the central axis of the vibrating plate (24) becomes the center of its own rotation. On the upper face of the vibrating plate (24) is installed fast the bowl (1) in which the orientation and conveyance of the articles is to be conducted. In the capacity of bearings are usually used dry bearing or stroke bearing. But in order to support the bowl (1) or the vibrating plate (24), it suffices to support the peripheral part or under face of the vibrating plate (24) instead of resorting to the main shaft (2).

To the above mentioned, it is possible to add some modification such that the main shaft (2) is fastened to the base (3), and the horizontally vibrating plate (35) is attached to the main shaft (2) rotatably by means of ball bearings, and so on.

As for the links (17), they have a function as the up-and-down vibration mechanism (B) which makes the vibrating plate (24) move up and down through the relative rotation between the horizontally vibration plate (35) and the vibrating plate (24). In praxis, several pieces of them are put in use (in the figure is shown three pieces of them). This link (17) is formed at both end into ball sockets. The length of it is adjustable at need. It abuts with its both ends against the upside and downside vibrating plates (35) (24) in the state where its axis is inclined by the angle $\theta$ to the vertical direction to the opposite side to the conveying direction of the articles, thereby interconnecting both of the above vibrating plates and at the same time supporting the vibrating plate (24).

The driving device (A) is composed of the motor (10) stationed by the side of the bowl (1), the eccentric plate (12) attached to the shaft of the motor (10) through the boss (11), the crank plates (41) (42) pivoted on the eccentric plate (12) through the bearings (39) (40), and the tie rods (43) (14) and the rod ends (44) (13') connecting the crank plates (41) (42) to the horizontally vibrating plate (35) and the vibrating plate (24). The motor (10) can be used whichever sort it may be, for example, electric motor or air motor or any other motor, but it is commendable to select such a one whose number of revolution is variable. The distance between the respective centers of the shaft of the motor (10) and that of the eccentric plate (12), namely, the quantity d of eccentricity can be adjusted at the fitting position of both the boss

(11) and the eccentric plate (12). The tie rod (43) is fixed at its one end on the crank plate (41) and is connected at its other end to the rod end (44). The rod end (44) is coupled with the horizontally vibrating plate (24).

In such a configuration, if the motor (10) is made to rotate in the direction of the arrow M (counter-clockwise), the eccentric plate (12) rotates eccentrically to the shaft of the motor (10), so that the crank plates (41) (42) oscillate in the width of vibration of two times as much as the quantity d of eccentricity, imparting the angular vibration to both the horizontally vibrating plate (35) and the vibrating plate (24). In this time, both tie rods (43) (14) are set up at the angle α to the eccentric plate (12) and so as to make both vibrating plates (35) (24) rotate in the opposed directions to each other. Consequently, the angular vibration imparted to the horizontally vibrating plate (35) comes to advance in the phase difference by $\pi + \alpha$ as compared with the angular vibration of the vibrating plate (24). (This advanced angle in the phase is represented as $\phi$.) As the result, every part of both the vibrating plate (24) and the bowl (1) fixed on the vibrating plate (24) perform the vibration describing the almost elliptical locus in one and the same vertical plane by the action of the links (17) . . . .

Figure 24:
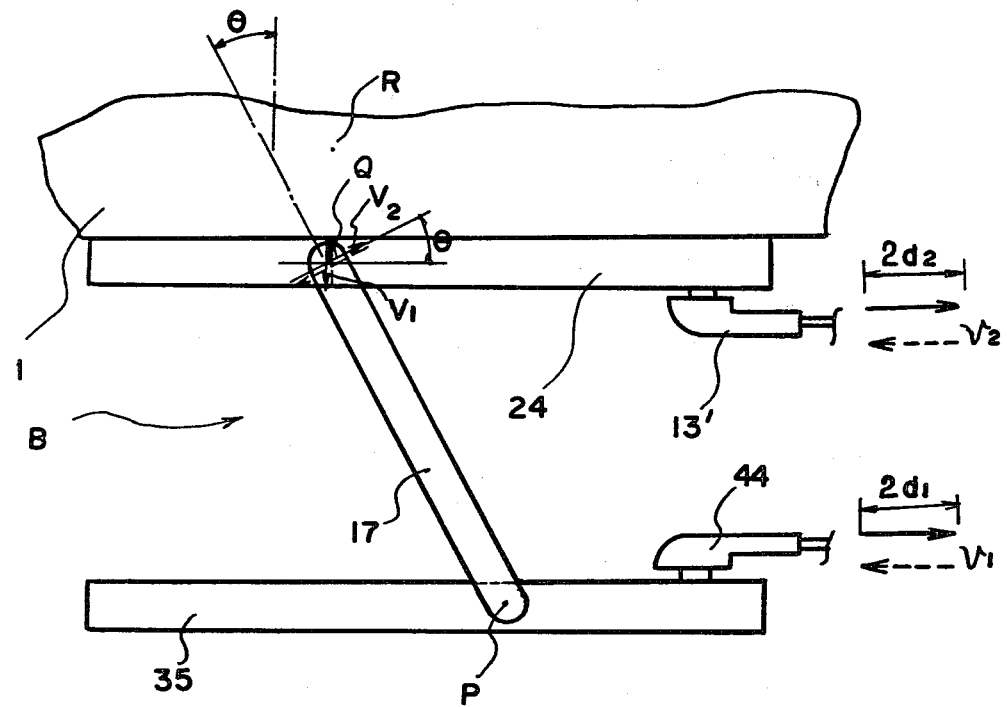
Figure 25:
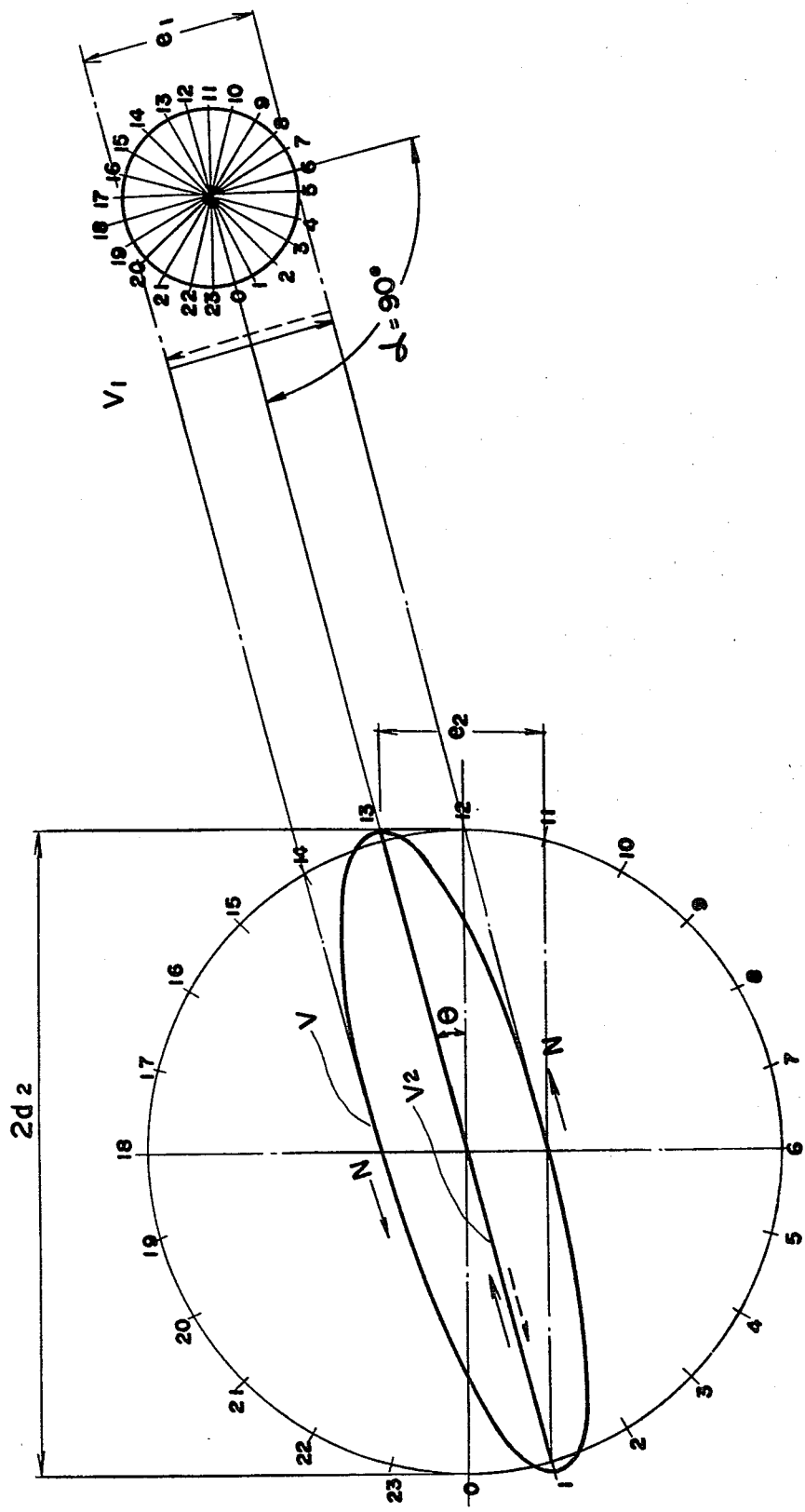

Referring now to the form of the vibration imparted to the vibrating plate (24), FIG. 24 is an explanatory drawing, showing the correlation between the horizontally vibrating plate (35) and the vibrating plate (24) and the link (17), wherein both the vibrating plates (35) (24) are brought into the angular vibration at the width of vibration $2d_1$ and $2d_2$, respectively, by the rotation of the motor (10). However, this width of vibration is very extremely small as compared with the radiuses of both the vibrating plate (35) (24). Hence, the material points P and Q on both vibrating plates (35) (24) perform the respective simple harmonic motions along the short course which is able to be considered approximately as the straight line. Supposing now the vibrating plate (24) is let not to perform the angular vibration, but is possible to do only the up-and-down motion, while on the other hand only the horizontally vibrating plate (35) is given the angular vibration $v_1$ by making it rotate around the main shaft (2) as the center, the material point Q on the vibrating plate (24) performs the up-and-down vibration $V_1$ in the maximum width $e_1 = 2d_1 \cdot \tan \theta$ in the vertical direction through the action of the link (17), as seen in FIGS. 24 and 25. This up-and-down vibration $V_1$ is conducted sine-curvedly, as shown in FIG. 25, in company with the rotation of the eccentric plate (12).

Now, let the horizontally vibrating plate (35) be fixed fast, while the angular vibration $v_2$ is imparted only to the vibrating plate (24). Then, the material point Q performs the simple harmonic motion $V_2$ which is inclining at the angle $\theta$ to the horizontal direction, as shown in FIGS. 6 and 7. In this case, the width $e_2$ of the up-and-down motion of the component on the vertical direction can be represented by the formula $e_2 = 2d_2 \cdot \tan \theta$. The movement of the material point Q is performed sine-curvedly, as shown in FIG. 25.

If both vibrating plates (35) (24) are simultaneously given the angular vibrations $v_1$ and $v_2$, the material point Q does the composed vibration of the two $V_1$ and $V_2$. If the angle of phase advance $\phi$ falls within a certain scope, this composite vibration performs the vibration V of the inclining elliptical locus in the almost same vertical plane, as shown in FIG. 7. FIG. 25 shows the case, wherein $d_1 = d_2 = d$, the angle of inclination of the link (17) is 15°, and the angle between the two tie rods (43) and (14), hence $$\psi = \pi + \frac{\pi}{2} = \frac{3}{2}\pi,$$

and the vibration is conducted in the direction of the arrow N.

Every part of the bowl (1) does the elliptical vibration similarly to the elliptical vibration V of the vibrating plate (24), but the way of vibration is performed in such a manner that it extends into the direction of the major axis of the elliptical locus outside from the position of the stay (46) of the vibrating plate (24), and that it takes the contracted form of the direction of the major axis inside from the position of the stay (46).

The form of the elliptical vibration V changes dependently on the position of the bowl (1) in the radial direction, as mentioned above. Besides, it also fluctuates in different ways owing to the width of vibration $2d_1$ and $2d_2$ of the angular vibrations $v_1$ and $v_2$, the angle of inclination $\theta$ of the link (17), and the angle of phase advance $\phi$.

Therefore, it is possible to determine the form of the optimum elliptical vibration in accordance with the sort and size of the part, namely, articles which is to be conveyed, the frictional force between the articles and the track surface, the slope of the track, the necessary conveying velocity, and the other conditions. As $d_1$ becomes broader, $e_1$ also grows larger, as the result of which the minor axis of the elliptical vibration is elongated, while as $d_2$ becomes broader, the major axis increases. The adjustment in such a case can be conducted at the fitting part of the boss (11) and the eccentric plate (12), as mentioned above. If the aforesaid example (FIGS. 19 to 23), $d_1$ and $d_2$ are united in one pieces with d and increase and decrease.

Figure 23:
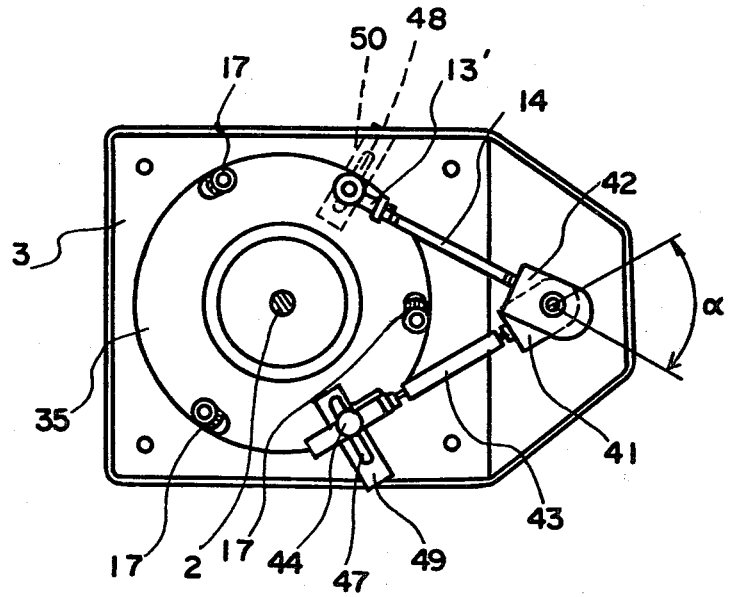

The alteration of the angle of phase advances means the change of the angle between the two tie rods (43) (14) in the aforesaid example (FIGS. 19 to 23). For this purpose, it is good to make the fitting positions of the stays (45) (46) variable by providing the horizontally vibrating plate (35) and the vibrating plate (24), for example, with the levers (49) (50) each having their own grooves (47) (48), as shown in FIG. 23.

Figure 27:
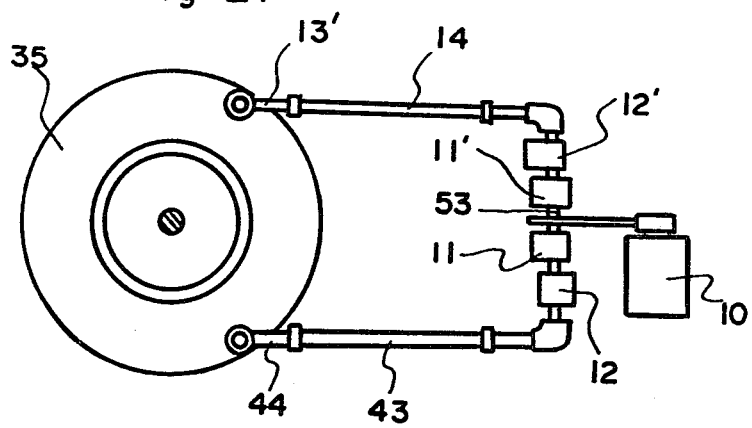
Figure 28:
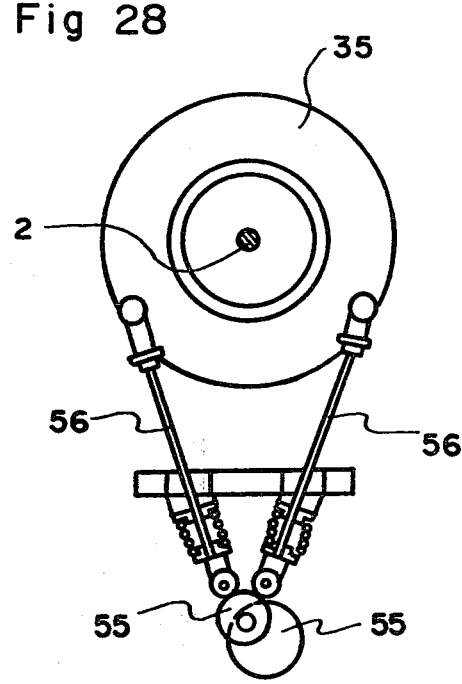
Figure 26:
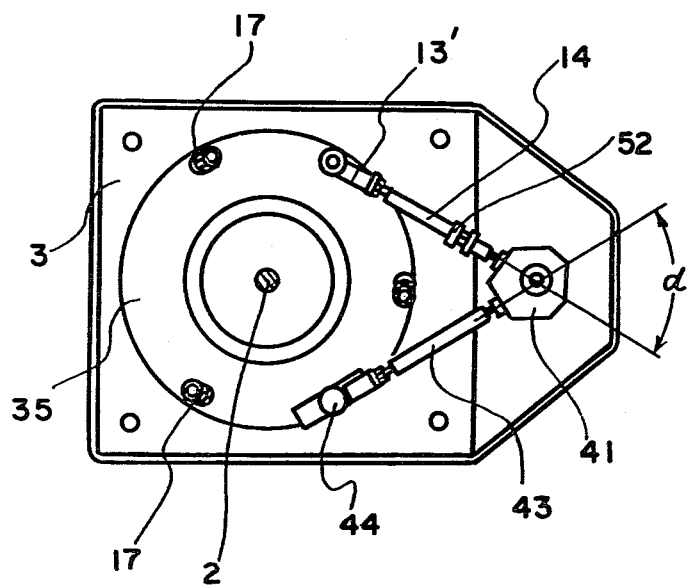

FIGS. 26 to 28 show the other examples of the driving devices according to the invention.

FIG. 26 has a very simple construction wherein two pieces of tie rods (43) (14) are fastened to one piece of crank plate (41). In this case, with the view to liberating the minute change in the angle α and the force resulting from the up-and-down motion of the tie rod 14, a link ball (52) is interposed in the tie rod (14). In this construction, however, α is fixed, and $d_1$ and $d_2$ are unchangeable in themselves.

The one shown in FIG. 27 is so composed that the driving shaft (53) is put in rotation not directly from the shaft of the motor, but through a belt or the like, and that several pairs of bosses (11) (11') and so many eccentric plates (12) (12') are attached to both sides of the driving shaft (53) as being arranged in a row. In this case, $d_1$ and $d_2$ are changeable independently from each other. It does not matter here whether any kinds of crank mechanism are used other than the mentioned above.

The one shown in FIG. 28 is such that gives the angular vibration to both the vibrating plates (35) (24)

while using cams instead of the crank form. The rotational motion of the cams (54) (55) fixed on the motor shaft or driving shaft is transmitted to both the vibrating plates (35) (24) through oscillating bars (56) (57).

In this connection, in the capacity of the up-and-down vibration mechanism (B), it is possible to employ a combination of ball screws with ball nuts, otherwise of inclined cams with rollers, on the device of the examples of FIGS. 19 to 28.

As described above, the present invention is such a vibratory bowl feeder that utilizes a electric motor in the capacity of a driving source, that enable each and every portion of the bowl to do the rotational vibration in the horizontal direction uniformly and forcibly, and that makes the bowl vibrate also in the up-and-down direction, thereby performing the conveyance of the articles stored on call. In such a design, its performance is not subject to the influence of the geometry of the bowl, the number and fitting position of the attachment, or the quantity of the articles put in the bowl. In addition, it is possible to select its amplitude and frequency, and it is easy to adjust it, so that the optimum conveying velocity can be obtained at will so as to be suitable for the articles and its assembling process. Besides, since plate springs or solenoids are not used here, the adjustment can be easily conducted at the time of the making and assembling of it. In a word, it is of light weight and compact design with less power consumption, thus being able to obtain the products of excellent quality at low cost and in large quantities. Further there is no question about the magnetization of the parts attributable to solenoid. The relative position between the bowl and the base is kept unchangeable. The connection with external equipment such as, for example, fixed chute is easy to manipulate, whereabouts there is no fear of the parts getting clogged or falling off. A mere modification of the setting direction of cams or cam followers suffice the alteration of the conveying direction, so that these parts are capable of serving for common use. The height of the device can be recompacted under the half of conventional ones. All things considered, it may be said as a conclusion that the device according to the present invention has many-sided and very excellent advantages and effect.

When using the cam mechanism in the capacity of a driving device, it becomes possible to give practical effect to the non-linear vibration having the difference in velocity there and back owing to the form of the cam, and further to give an ideal vibration without being attended by the backward slip or jump attributable to the coefficient of friction between the articles and the track surface.

What is more, by separating the peripheral conveying part of the bowl from the base plate of its bottom part, and by giving this separated base plate the horizontally or rotationally angular vibration, the movement of the articles on the base plate toward the external periphery becomes smooth and is not affected by the coefficient relative to the articles. Under these circumstances, it is not necessary for such a separated bottom to be replaced by an umbrella-shaped base plate having different inclination for meeting the varying coefficient. In this case, since the bowl and the base plate are guided by one and the same main shaft, the gap between them can be formed closely and tightly as much as possible, thereby enabling the vibratory bowl feeder having the separated bottom to be used for the articles of minute size.

On the other hand, by using the horizontally vibrating plate and the vibrating plate and making these two vibrating plaves performing the angular vibration with the phase difference, it becomes possible to give every part of the bowl the inclined elliptical vibration in one and the same vertical plane which is the ideal vibration as the form of the vibration. The form of this elliptical vibration can be modified in different ways with simple operation as occasions demand so as to be able to convey the parts put in the bowl and the other articles rapidly and exactly.

The working principle of the vibratory bowl feeder according to the present invention can be applied also to the vibratory in-line feeder. In this practical application, it will do if the rectlineal vibrations with the phase differences are given to both the horizontally vibrating plate (3) and the vibrating plate (5) instead of giving the angular vibrations with the phase differences, otherwise it is good enough to support the bowl by means of a slide guide, that is, an inclined trough without supporting it on the main shaft rotatably.

What we claim is:

1. A vibratory bowl feeder, comprising:
a base;
a bowl for holding articles to be fed;
a vibratory plate fastened to the bowl;
first means for securing the vibratory plate to the base in a manner that the bowl is rotatable and will move up and down with respect to the base when rotated;
a rotatable shaft;
an eccentric plate secured to the shaft;
motor means for rotating the shaft; and
second means for converting rotational motion of the shaft to oscillatory rotation of the bowl, said second means including a link arm of adjustable length, one end of the link arm being pivotally secured to the eccentric plate and another end of the link arm being pivotally secured to the vibratory plate.

2. A vibratory bowl feeder, comprising:
a base;
a bowl for holding articles to be fed;
a vibratory plate fastened to the bowl;
first means for securing the vibratory plate to the base in a manner that the bowl is rotatable and will move up and down with respect to the base when rotated, said first means comprising a vertical cylindrical fixed post, a collar, and at least two ball bearings, the post extending upwardly from the base and bearing a helical peripheral groove, the collar receiving an upper portion of the post, and said at least two ball bearings riding in the groove between the post and the collar;
a rotatable shaft;
motor means for rotating the shaft; and
second means for converting rotational motion of the shaft to oscillatory rotation of the bowl, said second means including a link arm of adjustable length.

3. A vibratory bowl feeder as in claim 1 or 2, wherein the bowl has a spiral track along which articles to be fed can move when the bowl is vibrated.

4. A vibratory bowl feeder as in claim 1 or 2, wherein the bowl and the vibratory plate are integral with each other.

5. A vibratory bowl feeder as in claim 4, wherein the vibratory plate is detachably secured to said first means.

* * * * *